United States Patent
Todd

(10) Patent No.: US 10,137,582 B2
(45) Date of Patent: Nov. 27, 2018

(54) FLUX BRIDGE FOR PIVOT MOTORS

(71) Applicant: WAHL CLIPPER CORPORATION, Sterling, IL (US)

(72) Inventor: David Todd, Polo, IL (US)

(73) Assignee: Wahl Clipper Corporation, Sterling, IL (US)

(*) Notice: Subject to any disclaimer, the term of this patent is extended or adjusted under 35 U.S.C. 154(b) by 0 days.

(21) Appl. No.: 15/355,794

(22) Filed: Nov. 18, 2016

(65) Prior Publication Data
US 2018/0141224 A1    May 24, 2018

(51) Int. Cl.
| B26B 19/00 | (2006.01) |
| B26B 19/28 | (2006.01) |
| B26B 19/06 | (2006.01) |
| B26B 19/38 | (2006.01) |
| H02K 33/06 | (2006.01) |
| H02K 33/16 | (2006.01) |

(52) U.S. Cl.
CPC .......... B26B 19/284 (2013.01); B26B 19/06 (2013.01); B26B 19/282 (2013.01); B26B 19/3873 (2013.01); H02K 33/06 (2013.01); H02K 33/16 (2013.01)

(58) Field of Classification Search
CPC ........ H02K 33/06; H02K 33/16; B26B 19/06; B26B 19/284; B26B 19/3873; B26B 19/28; B26B 19/282
USPC ........................................ 30/209; 310/36, 37
See application file for complete search history.

(56) References Cited

U.S. PATENT DOCUMENTS

| 1,357,364 A | 11/1920 | Van Bree |
| 1,671,265 A | 5/1928 | Andis |
| 2,063,116 A | 12/1936 | Nordhem |
| 3,079,687 A | 3/1963 | Jespon |
| 3,296,468 A | 1/1967 | Townshend |
| 3,343,011 A * | 9/1967 | Daniels ............. H02K 33/04  310/21 |
| 3,378,706 A | 4/1968 | Franzene |
| 3,437,852 A | 4/1969 | Cox |
| 3,469,130 A | 9/1969 | Jines et al. |
| 3,493,793 A | 2/1970 | Niemela |
| 3,521,093 A | 7/1970 | Harms |

(Continued)

FOREIGN PATENT DOCUMENTS

| CN | 105024515 A | 11/2015 |
| FR | 2 268 386 | 4/1974 |

(Continued)

OTHER PUBLICATIONS

Extended EP Search Report issued in corresponding EP Patent App. No. 17 20 128.1, dated Apr. 13, 2018.

*Primary Examiner* — Jason Daniel Prone
*Assistant Examiner* — Samuel A Davies
(74) *Attorney, Agent, or Firm* — Greer Burns & Crain Ltd.

(57) ABSTRACT

A pivot motor has a stator and an armature. The armature has an assembly of two spaced permanent magnets and a triangular flux bridge on one end. Magnetic flux is generated by passing alternating current through an electrical coil in the stator. The flux flows through the permanent magnets to generate electromotive force that vibrates the armature. The triangular flux bridge adjacent the magnets facilitates the flux flow, increasing motor power under typical load conditions and motor efficiency.

5 Claims, 6 Drawing Sheets

(56) References Cited

U.S. PATENT DOCUMENTS

| | | | |
|---|---|---|---|
| 3,538,358 A | | 11/1970 | Bauerle |
| 3,571,633 A | | 3/1971 | Timmerman |
| 3,679,921 A | | 7/1972 | Jank |
| 3,781,736 A | | 12/1973 | Parker |
| 3,906,263 A | | 9/1975 | Chen et al. |
| 4,141,352 A | | 2/1979 | Ebner et al. |
| 4,326,138 A | | 4/1982 | Shtrikman |
| 4,392,092 A | | 7/1983 | Gassner |
| 4,460,854 A | | 7/1984 | Bauer |
| 5,189,751 A | * | 3/1993 | Giuliani .................. A61C 17/20 15/22.1 |
| 8,418,369 B1 | * | 4/2013 | Laube .................. B26B 19/3893 30/210 |
| 2006/0059696 A1 | | 3/2006 | Derby et al. |
| 2007/0152791 A1 | | 7/2007 | Lee et al. |
| 2008/0106156 A1 | | 5/2008 | Reishus et al. |
| 2013/0200823 A1 | * | 8/2013 | Chan ..................... H02K 33/16 318/3 |

FOREIGN PATENT DOCUMENTS

| | | |
|---|---|---|
| GB | 1255808 A | 12/1971 |
| WO | 9216160 A1 | 10/1992 |

\* cited by examiner

FLUX BRIDGE FOR PIVOT MOTORS

This invention relates to pivot motors, and more particularly to pivot motors having a triangular flux bridge in the armature.

BACKGROUND OF THE INVENTION

Conventional pivot motors are used in hair clippers because they produce reciprocating motion that vibrates a cutting blade to cut hair. Such pivot motors have an armature with a drive arm on one end, a magnetic assembly on the opposite end, and a pivot between the drive arm and the magnetic assembly. A stator located adjacent the magnetic assembly produces magnetic flux that drives the armature back and forth, in turn oscillating a reciprocating blade to cut hair. The power transmitted to the reciprocating blade is affected by the efficiency of the magnetic circuit and flux transfer of energy between the stator and the magnetic assembly.

In a known magnetic assembly, shown in FIGS. 5A and 5B, an alternating current passing through a coil 502 generates magnetic flux that passes through laminations 504. The flux passes through a magnetic assembly 506 in an armature (not shown in FIGS. 5A and 5B). The flux draws the magnetic assembly to the position shown in FIG. 5A during one portion of the alternating current cycle.

The magnetic assembly 506 includes two magnets 508, 510 arranged at an oblique angle to each other. A V-shaped flux bridge 512 spans the two magnets, which increases power and efficiency. The present invention further improves efficiency and further increases power transfer in such pivot motors.

Accordingly, one object of this invention is to provide new and improved pivot motors.

Another object is to provide new and improved pivot motors having improved efficiency and better power transfer from the stator to the magnetic assembly in the armature.

Still another object is to provide new and improved hair clippers that are driven by a pivot motor.

Yet another object is to provide new and improved hair clippers having more efficient and more powerful pivot motors.

SUMMARY OF THE INVENTION

The present inventors have identified problems with the design of flux bridges in pivot motors, in that the V-shape flux bridge guides the flux along a longer path since it is bent in towards the center. The bend also concentrates the flux at the center of the flux bridge which can lead to the material being saturated in that area. This is illustrated in FIG. 5B by the flux lines that are converging in the center of the flux bridge causing saturation. Both of these issues are improved by the triangle shaped flux bridge of the present invention, as it provides a straight path between the magnets. With the thicker center, the flux is not as concentrated, in other words it helps reduce saturation.

Accordingly, the present inventors have provided a more efficient pivot motor with increased stroke length and reduced power consumption.

In keeping with one aspect of this invention, a pivot motor has a stator and an armature. The armature has a magnetic assembly of two spaced permanent magnets and a triangular flux bridge on one end. Magnetic flux generated by passing alternating electrical current through an electrical coil in the stator flows through the permanent magnets and triangular flux bridge to generate electromechanical force that oscillates the armature. The triangular flux bridge facilitates the flux flow, increasing motor power and motor efficiency. The motor can be used in hair clippers.

BRIEF DESCRIPTION OF THE DRAWINGS

The above mentioned and other features of this invention and the manner of obtaining them will become more apparent, and the invention itself will be best understood by reference to the following description of an embodiment of the invention taken in conjunction with the accompanying drawings, in which.

DETAILED DESCRIPTION

Figures 1, 2:
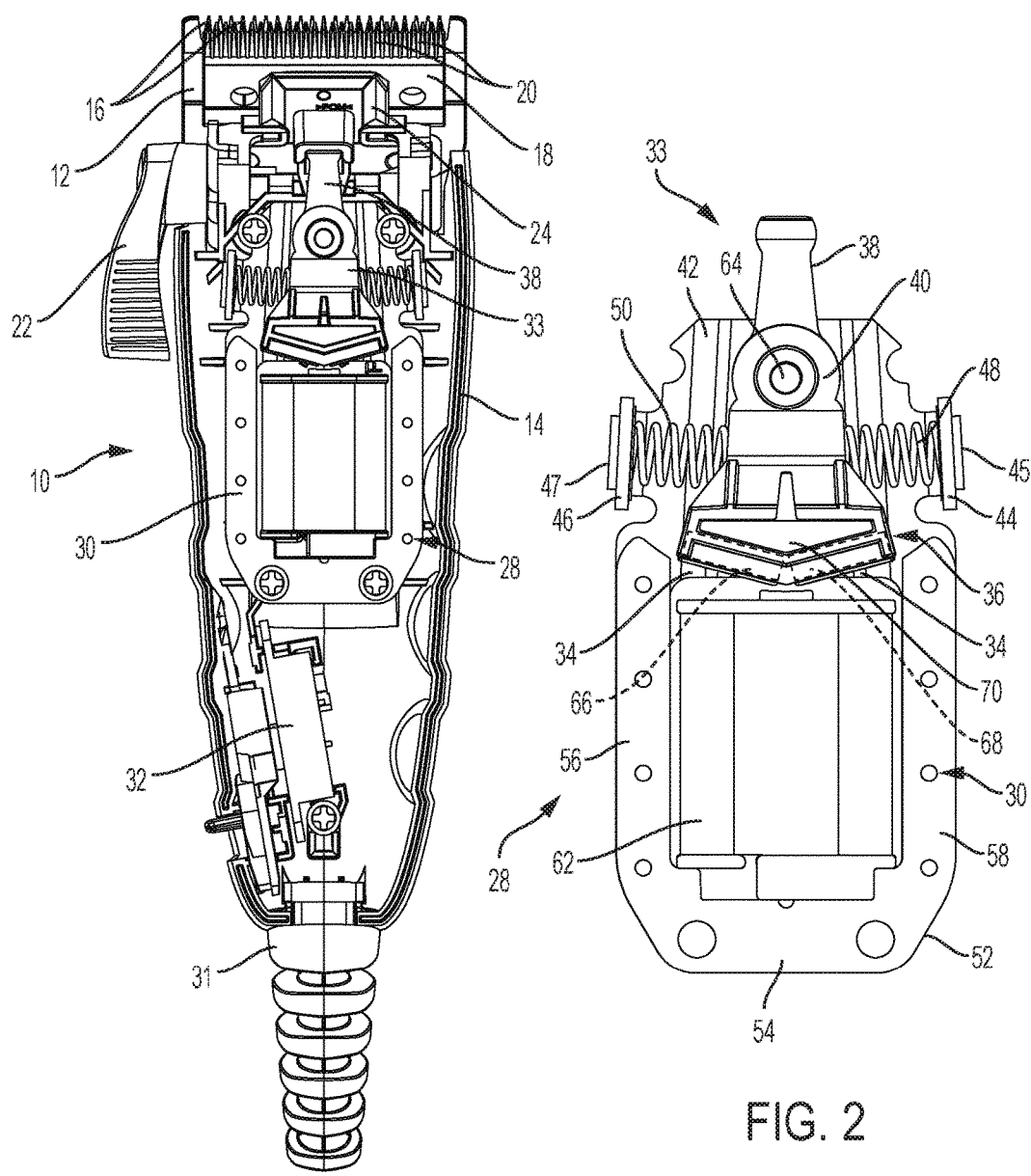
FIG. 1 is a plan view of the inside of a hair clipper having a pivot motor made in accordance with an embodiment of the invention.
FIG. 2 is a plan view of the pivot motor of FIG. 1.

As seen in FIG. 1, a hair clipper 10 has a stationary blade 12 secured to a housing 14. The stationary blade 12 has a first row of cutting teeth 16.

A reciprocating blade 18 is operatively secured against the stationary blade 12. The reciprocating blade 18 has a second row of cutting teeth 20 that complement the first row of cutting teeth 16. The distance between the tips of the first and second rows of cutting teeth can be set by and changed using an adjustment lever 22.

A driven element 24 is secured to the reciprocating blade 18. The reciprocating blade 18 is pressed against the stationary blade 12 by a spring (not shown) that allows the reciprocating blade to move back and forth, causing the cutting teeth to cut hair in operation.

A pivot motor 28 is also secured in the housing 14. The pivot motor 28 is powered by alternating current supplied through a power cord 31, a switch 32 and lead wires (not shown).

As seen in FIG. 2, the pivot motor 28 has a stator 30, and an armature 33 spaced from the stator 30 by an air gap 34. The armature 33 has a magnetic assembly 36 on a first end, a drive arm 38 on an opposite second end, and a pivot 40 between the magnetic assembly 36 and the drive arm 38.

Figure 3:
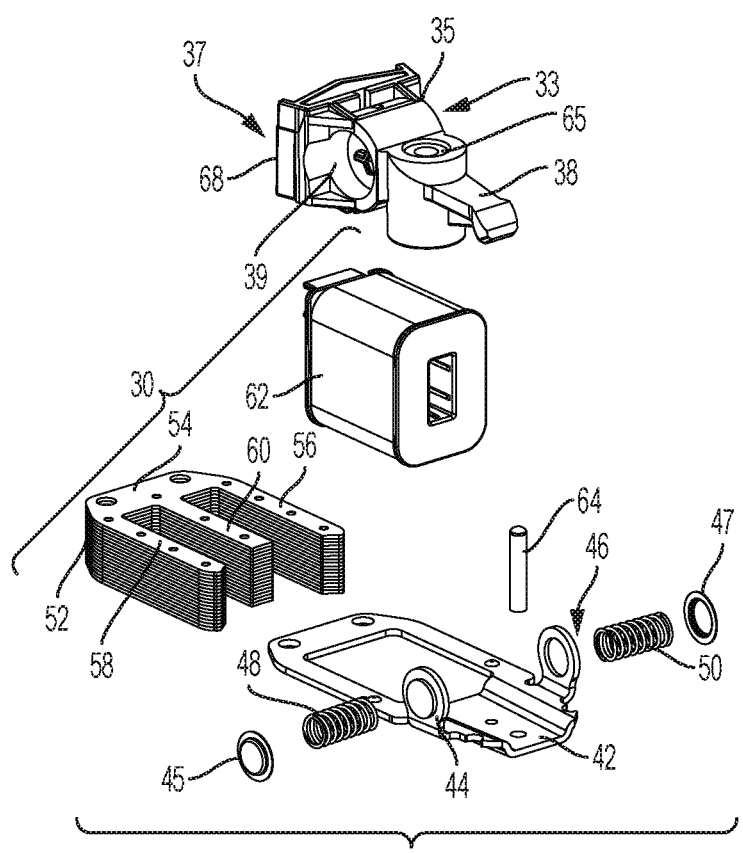
FIG. 3 is an exploded view of the pivot motor of FIG. 1.
Figure 4A:
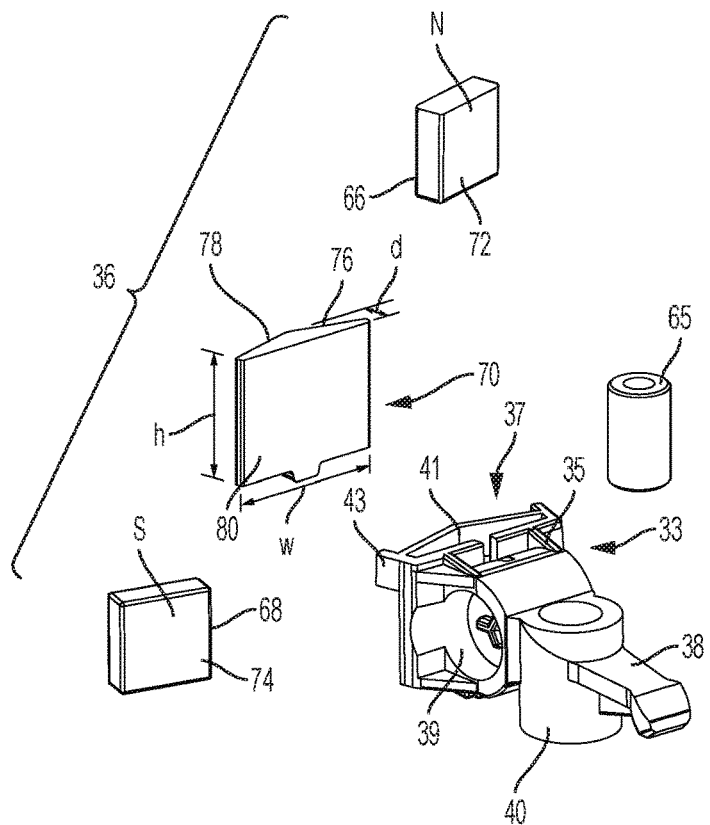
FIG. 4A is an exploded view of the armature in the motor of FIG. 1.

As seen in FIGS. 3 and 4A, the armature 33 can be a molded plastic piece 35 that includes the drive arm 38, the pivot 40, and an armature arm 37. The armature arm 37 has a pair of opposed openings 39 for the springs 48, 50, a slot 41 that receives the flux bridge 70, and an alignment skeleton 43 that sets the magnets 66,68 correctly in the armature arm 37. The skeleton 43 allows direct contact between the magnets 66, 68 and the flux bridge 70.

The pivot motor 28 can be assembled in a frame 42. The frame 42 has a pair of ears 44, 46. A spring 48 is set under compression between the ear 44 and one side of the drive arm 33 adjacent the magnetic assembly 36. A cap 45 reduces noise from the spring shifting while the motor is running. A second spring 50 is set under compression between ear 46 and the opposite side of the armature 33, also adjacent the magnetic assembly 36. A cap 47 reduces spring noise.

Referring again to FIG. 1, the drive arm 38 is operatively connected to the reciprocating blade 18 when the motor 28 is installed in the housing 14. As will be described in more detail, when power is applied, magnetic flux generated in the stator 30 flows through the magnetic assembly 36, causing the magnetic assembly to oscillate. That oscillation in turn causes the drive arm 38 to oscillate, which in turn causes the reciprocating blade 18 to vibrate and cut hair.

As seen in FIGS. 2 and 3, the stator 30 has a plurality of stacked laminations 52. The laminations can be loosely stacked together or partially pierced to hold them together in a stack. The laminations 52 have a back 54, first and second outer arms 56, 58, and a center arm 60 arranged so as to form an E shape. A coil 62 surrounds the center arm 60 when the stator 30 is assembled.

The first and second springs 48, 50 are compressed so that the armature 33 is centered adjacent the center arm 60 of the laminations 52 when the motor is not operative, as seen in FIG. 1. The armature is rotatably secured to the frame 42 by a pin 64. A bushing 65 in the armature 33 facilitates rotating contact with the pin 64.

Figure 4B:
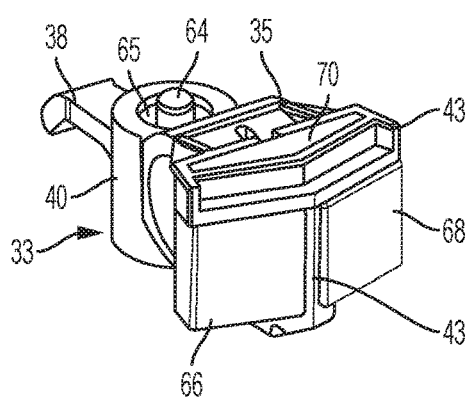
FIG. 4B is a perspective view of an assembled armature in the motor of FIG. 1.

The armature 33 and the magnetic assembly 36 are shown in more detail in FIGS. 4A and 4B. The magnetic assembly 36 has first and second permanent magnets 66, 68 at an outer side of the armature 33. The magnets 66, 68 are exposed to the stator 30 when the motor is assembled, as seen in FIG. 1.

The first permanent magnet 66 is spaced from and oriented towards the first arm 56 when the motor is not operative. The second permanent magnet 68 is spaced from and oriented towards the second arm 58 when the motor is not operative. The first magnet 66 and the second magnet 68 are oriented at an oblique angle with respect the center arm 60 and each other, as seen in FIG. 2. In this embodiment the permanent magnets are at an oblique angle to one another.

The magnetic assembly 36 also has a generally triangular flux bridge 70 located on an inner face 72 (FIGS. 4A and 4B) of the first permanent magnet 66 and an inner face 74 of the second permanent magnet 68. The flux bridge 70 has a first surface 76 in contact with and parallel to the first permanent magnet 66, a second surface 78 in contact with and parallel to the second permanent magnet 68, and a back surface 80 perpendicular to the center arm 60 (FIG. 1). Opposite polarities of the magnets 66,68 contact the flux bridge 70, indicated by N and S in FIG. 4.

In the context of the present invention, the shape of the flux bridge may be referred to as triangular. The shape of the flux bridge may also be referred to as triangular-prism shaped when viewed in three dimensions, or as having a triangular cross-section. This shape allows the flux bridge to occupy the space between the inner faces of the first and second permanent magnets. In other words, the flux bridge largely fills the space between the two permanent magnets.

The two permanent magnets may be described as having an oblique angle to one another, or as forming a V-shape. In this arrangement, the outer faces of the two permanent magnets are exposed to, or adjacent, the stator. The flux bridge may be described as filling or occupying the inner side of this V-shaped arrangement, contacting the inner faces of the permanent magnets and having a triangular cross-section.

Within the magnetic assembly, the flux bridge may be described as having a first surface in contact with the first permanent magnet, a second surface in contact with the second permanent magnet, and a back surface between the first and second surfaces. The first and second surfaces of the flux bridge contact the inner faces of the first and second permanent magnets.

Figure 5A:
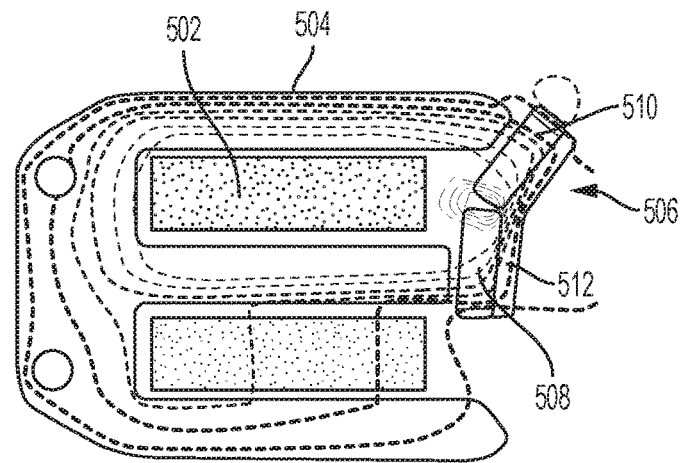
FIG. 5A is a diagram showing flux flow in a known pivot motor.
Figure 5B:
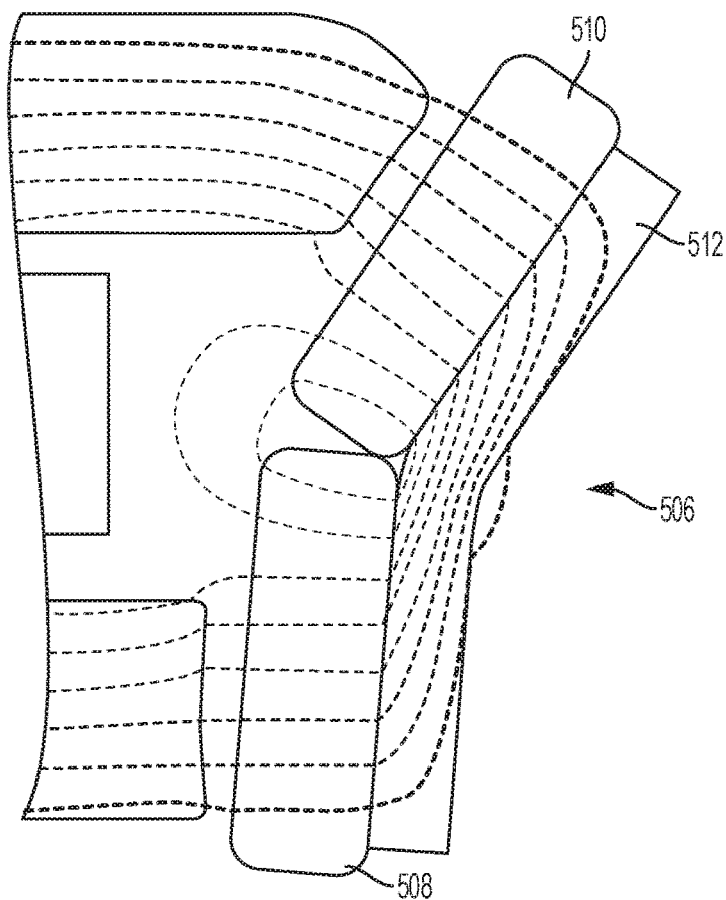
FIG. 5B is a diagram showing flux flow through the magnetic assembly in the armature of the known pivot motor of FIG. 5A.
Figure 6A:
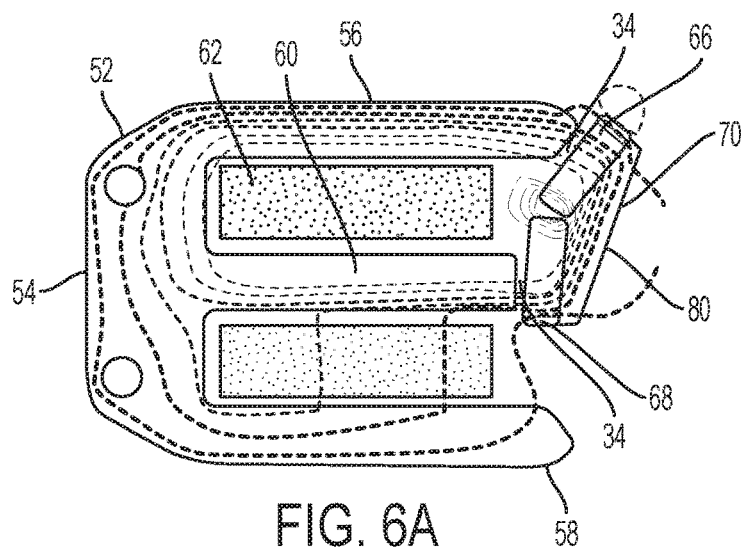
FIG. 6A is a diagram showing flux flow in a pivot motor having a triangular flux bridge made according to an embodiment of the present invention.
Figure 6B:
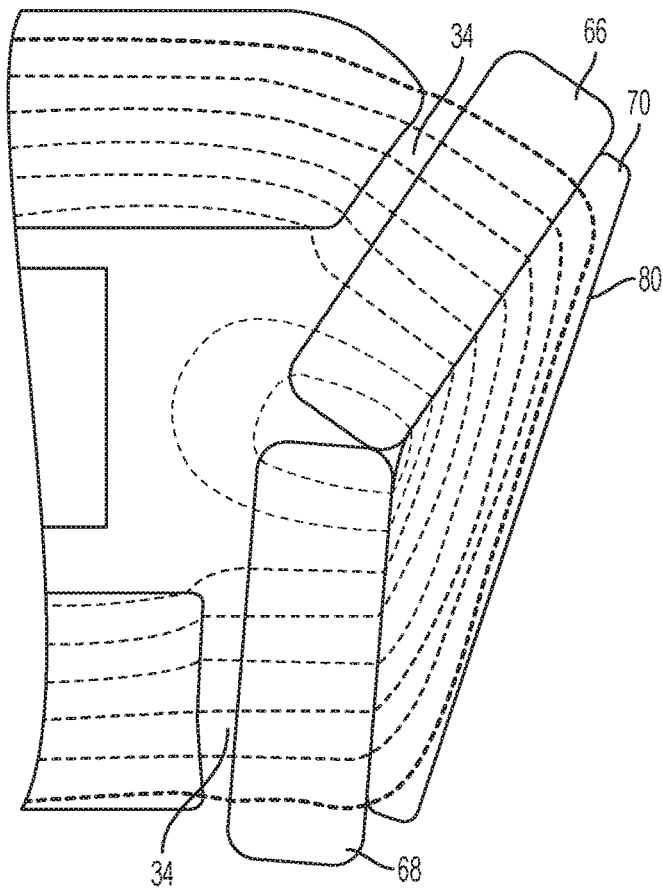
FIG. 6B is a diagram showing flux flow through the magnetic assembly of the armature of the pivot motor of FIG. 6A.

Turning now to FIGS. 6A and 6B, the coil 62 generates magnetic flux in the laminations 52 and the magnetic assembly 36 in operation, through a magnetic circuit that includes the air gap 34. Flux lines in the circuit are shown in dotted lines in FIGS. 5A and 5B and 6A and 6B.

As shown in FIG. 6B, the triangular-prism shape creates generally straight, or direct, flux flow paths between the inner faces of the permanent magnets. In particular, straight flux flow paths may be provided through the flux bridge between at least the outer corners of the inner faces of the permanent magnets. The flux bridge may be described as filling the space between the inner faces of the permanent magnets so as to provide straight flux flow paths between the inner faces of the permanent magnets. Although the paths provided for the flow of flux may be referred to as 'straight', some variation from straight may be foreseen in the actual flow of flux between the permanent magnets. The straight flux flow paths thus encompass generally straight paths. Importantly, the flux bridge of the invention provides a direct route for the flow of flux between the inner faces of the permanent magnets. It does not divert the flux flow from the straight or direct path between the inner faces of the permanent magnets.

The triangular flux bridge can also be described in relation to the arms formed by the laminations of the stator, and the permanent magnets. The flux bridge has a first surface in contact with the first permanent magnet, a second surface in contact with the second permanent magnet, and a back surface which is perpendicular to the center arm of the laminations when the armature is centered adjacent the center arm of the laminations.

The term 'triangular' as used to describe the flux bridge encompasses shapes which are generally triangular. Similarly, the terms 'triangular-prism shaped' and 'triangular-cross section' encompass shapes that are generally triangular-prism shaped or generally have a triangular-cross section. The triangular shape need not be a perfect triangle. By way of example, the triangle may have blunt or truncated corners. For example, the triangular flux bridge as shown in FIGS. 4A and 4B has blunted corners of the triangular cross-section. As described above, the significant feature of the triangular flux bridge is that it occupies the space between the inner faces of the permanent magnets to provide generally straight flux flow paths between the inner faces of the permanent magnets.

The flux bridge may be made from powdered metal. For example, the flux bridge may be made from a Soft Magnetic Composite (SMC) material. Various formulations of SMCs are available in the art.

In one embodiment, the approximate dimensions of the flux bridge are a height of 0.511 inches (12.9 mm), a width of 0.638 inches (16.20 mm) and a depth of 0.118 inches (3.0 mm). There are manufacturing tolerances for each of these dimensions. Importantly the flux bridge fits in the slot and is in direct contact with the permanent magnets. The height (h), width (w) and depth (d) are as shown in FIG. 4A. Height refers to the length of the triangular-prism. Looking at the triangular cross-section, depth refers to the distance between the corner of the triangle between the surfaces which contact the permanent magnets and the back surface of the triangle. Width refers to the length of the back surface.

Figure 7:
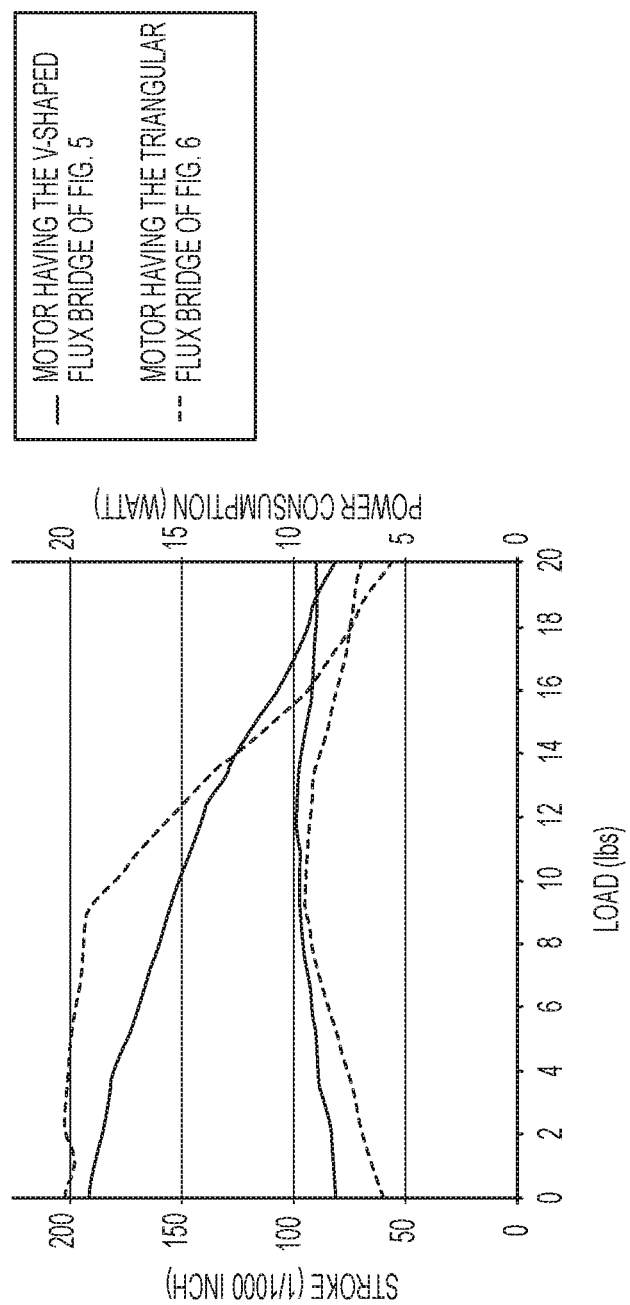
FIG. 7 is a graph comparing the stroke and power consumption of a prior art pivot motor with the stroke and power consumption of the present invention under varying load conditions.

The magnetic circuit and the V-shaped flux bridge in the motor of FIGS. 5A and 5B have been described. Experimental results comparing performance of a motor having the V-shaped magnetic flux bridge shown in FIGS. 5A and 5B with the performance of a motor having the triangular flux bridge of FIGS. 6A and 6B are shown in FIG. 7. Performance of the prior art motor of FIGS. 5A & 5B is shown in solid lines, and performance of the motor of FIGS. 6A & 6B is shown in broken lines.

Both stroke and power consumption were measured under increasing load conditions. Stroke refers to the distance the reciprocating blade moved in operation. Load refers to the resistance to movement of the reciprocating blade, which in use is related to the rate and quantity of hair that is forced between the teeth of the cutting blades. The experimental results of FIG. 7 were obtained by applying an artificial load to the armatures of the motors.

The top two lines in FIG. 7 compare the stroke of the two motors under increasing loads. Those results show that the motor with the triangular flux bridge starts with a longer stroke and its stroke is reduced less than the stroke of the motor with the V-shaped flux bridge as the load is increased to about 10 to 14 lbs. This confirms that the motor with the triangular flux bridge has more power.

The bottom two lines in FIG. 7 compare power consumption of the two motors. The power consumed by the motor having a triangular flux bridge was less than the power consumed by the other motor under all load conditions. This shows that the triangular flux bridge has reduced power consumption.

Given the increased power output and the reduced power consumption, the motor with the triangular flux bridge is more efficient.

While the principles of the invention have been described above in connection with specific apparatus and applications, it is to be understood that this description is made only by way of example and not as a limitation on the scope of the invention.

What is claimed is:

1. A pivot motor comprising,
   a stator and a plastic armature spaced from the stator by an air gap,
      the plastic armature having a magnetic assembly and a pair of opposed openings for first and second springs on a first end, a drive arm on an opposite second end, and a pivot between the first end and the second end,
      the magnetic assembly having first and second permanent magnets each having an outer face that is exposed to the stator, the first magnet and the second magnet being oriented at an oblique angle with respect to each other,
      the magnetic assembly further having a flux bridge located on an inner face of the first and second permanent magnets that is opposite to the outer face,
      the flux bridge occupying the space between the inner faces of the first and second magnets, the flux bridge having a first surface adjacent the first permanent magnet, a second surface adjacent the second permanent magnet, and a back surface between the first and second surfaces,
      wherein the plastic armature further includes an orifice that holds only the flux bridge, and an alignment skeleton outside of the orifice that sets the first and second permanent magnets in the armature.

2. The pivot motor of claim 1, the stator having a plurality of laminations, the laminations having a back, first and second outer arms and a center arm arranged so as to form an E shape, and a coil surrounding the center arm,
   the pivot motor further having a first spring adjacent one side of the armature and a second spring adjacent an opposite side of the armature, the first and second springs being tensioned so that the armature is centered adjacent the center arm of the laminations when the pivot motor is not operative,
   the outer face of the first permanent magnet being spaced from and oriented towards the first arm when the pivot motor is not operative, the outer face of the second permanent magnet being spaced from and oriented towards the second arm when the pivot motor is not operative.

3. A hair clipper comprising a pivot motor, the pivot motor comprising a stator and a plastic armature spaced from the stator by an air gap,
   the plastic armature having a magnetic assembly and a pair of opposed openings for first and second springs on a first end, a drive arm on an opposite second end, and a pivot between the first end and the second end,
   the magnetic assembly having first and second permanent magnets each having an outer face that is exposed to the stator, the first magnet and the second magnet being oriented at an oblique angle with respect each other,
   the magnetic assembly further having a flux bridge located on an inner face of the first and second permanent magnets that is opposite to the outer face,
   the flux bridge occupying the space between the inner faces of the magnets, the flux bridge having a first surface in contact with the first permanent magnet, a second surface in contact with the second permanent magnet, and a back surface between the first and second surfaces,
   wherein the plastic armature further includes an orifice that holds only the flux bridge, and an alignment skeleton that sets the first and second permanent magnets in the armature arm.

4. The hair clipper of claim 3, further comprising a stationary blade secured to a housing, the stationary blade having a first row of cutting teeth,
   a reciprocating blade operatively secured against the stationary blade, the reciprocating blade having a second row of cutting teeth that complement the first row of cutting teeth.

5. The hair clipper of claim 3, the stator having a plurality of laminations, the laminations having a back, first and second outer arms and a center arm arranged so as to form an E shape, and a coil surrounding the center arm,
   the hair clipper further having a first spring adjacent one side of the armature and a second spring adjacent an opposite side of the armature, the first and second springs being tensioned so that the armature is centered adjacent the center arm of the laminations when the pivot motor is not operative,
   the outer face of the first permanent magnet being spaced from and oriented towards the first arm when the pivot motor is not operative, the outer face of the second permanent magnet being spaced from and oriented towards the second arm when the pivot motor is not operative.

* * * * *